(12) United States Patent
Morris et al.

(10) Patent No.: US 6,477,144 B1
(45) Date of Patent: Nov. 5, 2002

(54) TIME LINKED SCHEDULING OF CELL-BASED TRAFFIC

(75) Inventors: Todd D. Morris, Stittsville (CA); Stacy W. Nichols, Kanata (CA); Norman A. Lyon, Hull (CA); Blake S. Toplis, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/150,243

(22) Filed: Sep. 10, 1998

(51) Int. Cl.[7] .................................................. H04J 3/14
(52) U.S. Cl. ............................. 370/230.1; 370/395.4; 370/412; 370/468
(58) Field of Search .............................. 370/229, 230.1, 370/231, 235.1, 395.1, 395.4, 395.41, 395.42, 395.43, 412, 468

(56) References Cited

U.S. PATENT DOCUMENTS

| 5,696,764 A | * | 12/1997 | Soumiya et al. |
| 5,712,851 A | * | 1/1998 | Nguyen et al. |
| 6,003,101 A | * | 12/1999 | Williams |
| 6,018,527 A | * | 1/2000 | Yin et al. |
| 6,047,000 A | * | 4/2000 | Tsang et al. |
| 6,198,724 B1 | * | 3/2001 | Lam et al. |
| 6,262,989 B1 | * | 7/2001 | Gemar et al. |
| 6,269,079 B1 | * | 7/2001 | Martin et al. |
| 6,295,295 B1 | * | 9/2001 | Wicklund |

OTHER PUBLICATIONS

Brown, Randy, "Calendar Queues: A Fast O(1) Priority Queue Implementation for the Simulation Event Set Problem", Communications of the ACM, vol. 31, No. 10, Oct. 1988, pp. 1220–1227.

* cited by examiner

*Primary Examiner*—Chau Nguyen
*Assistant Examiner*—Inder Pal Mehra
(74) *Attorney, Agent, or Firm*—Allan P. Millard (57) ABSTRACT

A node in a packet network such as an ATM network receives a plurality of traffic classes and outputs them to an output link. The invention relates to a technique of scheduling the traffic classes in a time linked fashion at the node based on the bandwidth allocated to each traffic class. Traffic scheduling based strictly on priority may not satisfy delay and loss guarantees of traffic classes when there are many classes with many different priority levels. The rate based scheduling in a time-linked fashion solves these problems by limiting the bandwidth to which each class is accessible. According to one embodiment, the invention uses timeslot values and a linked list of the traffic classes.

25 Claims, 9 Drawing Sheets

Fig 6 a) Encountering Traffic Classes with no cells to ship out

| Tupdate | Tnext | Phase | Empty | Congestion |

Tnext — The next time the class is to be serviced by the scheduler.

Tupdate — The interval between consecutive rate based servicing of a class.

Phase — Wrap around indicators used to avoid false class servicing.
a) When Tnext+Tupdate exceed the bit range and wraps around.
b) When the counter rolls over Max≥0.

Empty — A flag indicating an empty class.

Congestion — Indicates which loss priorities for a specific class are encoutering congestion.

= Null Pointer

Fig 12

TIME LINKED SCHEDULING OF CELL-BASED TRAFFIC

FIELD OF INVENTION

The invention generally resides in flow control mechanisms of telecommunications network. In particular, it is directed to scheduling of traffic classes at a node of an ATM network and more specifically to the traffic scheduling which is based on the rates allocated to each class of the traffic.

BACKGROUND OF INVENTION

Figure 1:
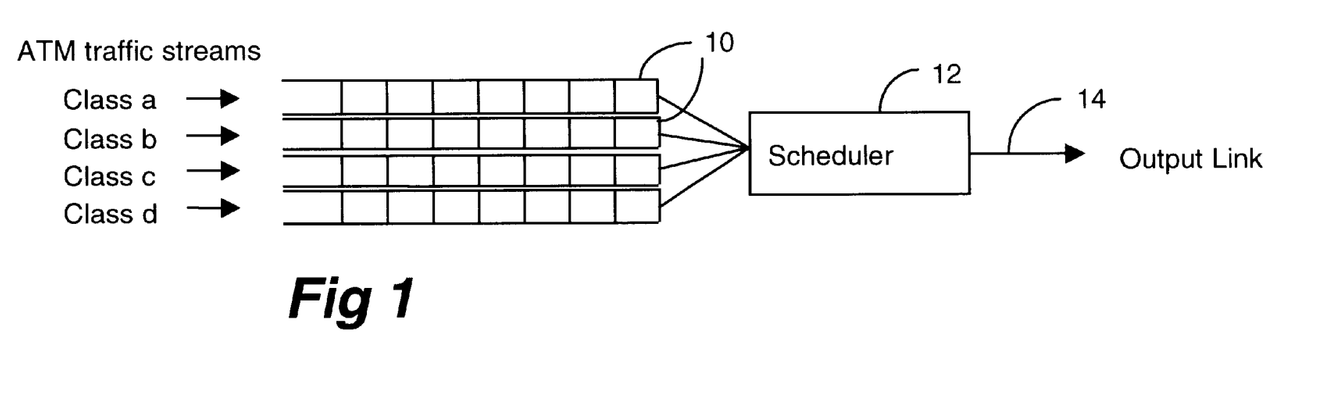
FIG. 1 is a schematic conceptual illustration of a scheduling mechanism.
Figure 2:
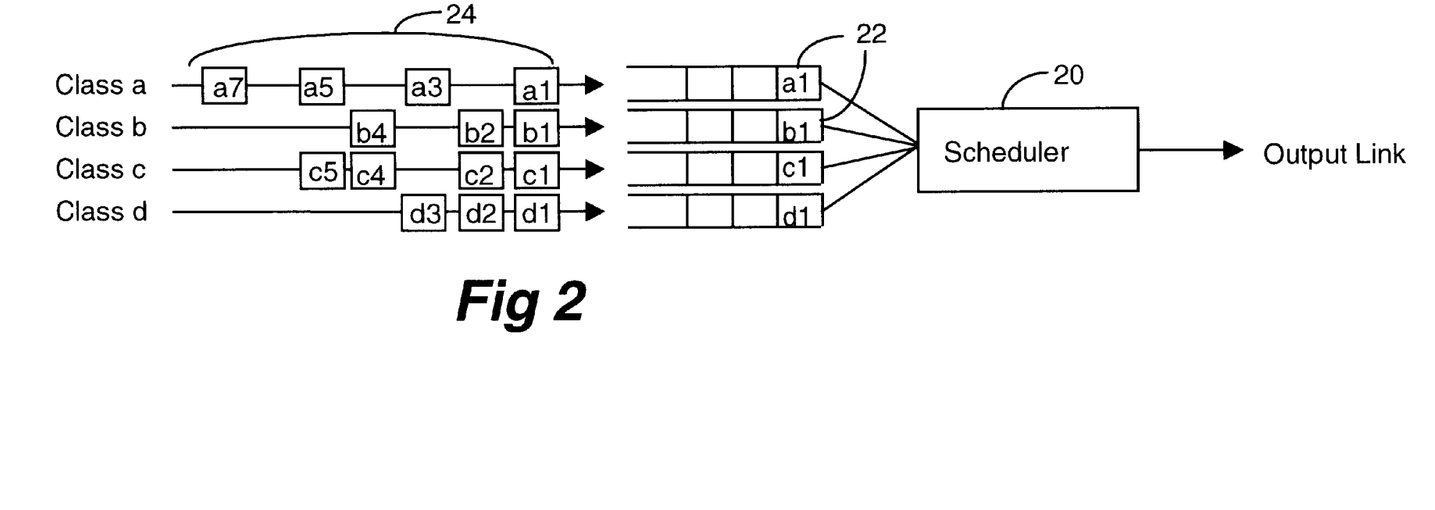
FIG. 2 is a schematic conceptual illustration of a scheduling mechanism showing also cell arrival in various traffic classes.
Figure 3:
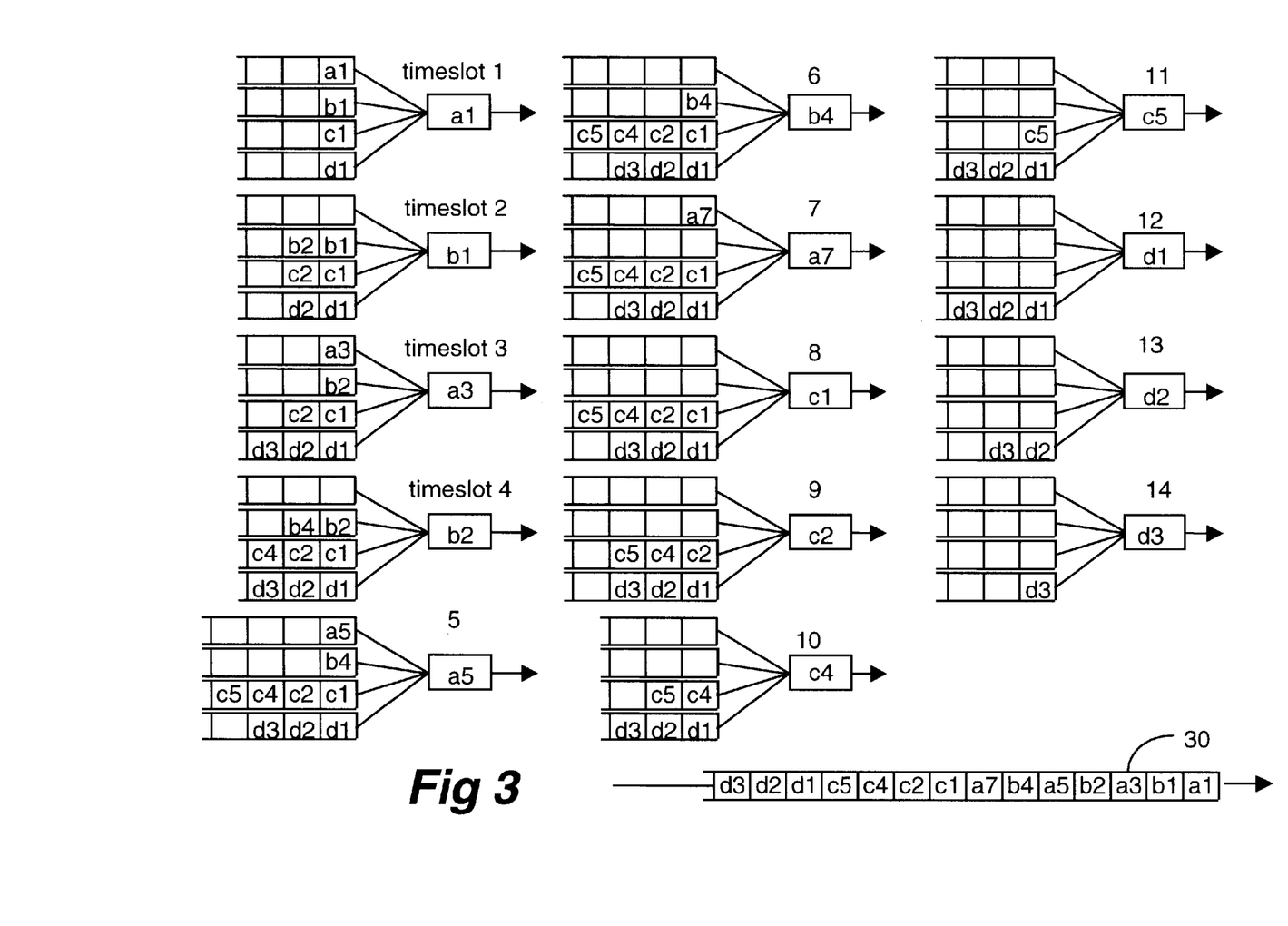
FIG. 3 shows status of queues and priority based selection of a cell for outputting in time sequence. It also includes an output profile showing a series of outputted cells.

ATM networks are multimedia networks which handle a mixture of traffic classes with diverse connection requirements. The networks-employ a variety of traffic control and/or network management techniques to ensure that the networks meet the connection requirements. In FIG. 1, a number of traffic classes a to d are buffered in separate queues 10 and a controller 12 (or scheduler) accesses the queues for outputting in a certain order so that an output link 14 of fixed capacity is shared by the traffic classes. Throughout the specification, "class" or "traffic class" is used to indicate a category of traffic in accordance with a certain descriptor. A class therefore may represent the traffic of one connection or may contain different connections, all having a common descriptor, i.e. all the cells in a class are buffered in the same queue. Therefore, there are as many queues as there are classes and the scheduler may be described as a queue controller. The classes may share the link according to one of many policies, such as strict priority, a fixed-rate per class, a guaranteed minimum rate per class, etc. In any of these policies, the maximum number of cells that a queue may transfer to the link in a single transaction may be limited to a predetermined bound. These control mechanisms are sometimes called scheduling mechanisms. In the priority based scheduling mechanism, one class of traffic will always be served before the other as long as there are cells to send. Satisfying the delay and loss requirements of the lower priority class may not be possible due to the traffic behaviour in the high priority class. When more priorities are added, satisfying delay and loss guarantees of each class becomes progressively more difficult. For example, FIG. 2 shows the priority scheduler 20 in which there are four queues 22 for four priority classes, a to d in the descending order. Relative arrival 24 of cells for each class is also shown in the figure. Cells are stored in respective queues when they arrive and the priority scheduler serves the queues according to the degree of priority. FIG. 3 is a series of charts showing conditions of the queues and a selection of a cell for output by a priority scheduler at each successive output timeslot (cell interval). At timeslot 1, cell a1 is selected because of its highest priority. At timeslot 2, however, cell b1 is selected because cell a3 is yet to arrive and b1 is the highest priority cell among cells stored in the queues. The sequence continues in a similar fashion. The output traffic 30 on the link would consists of a series of ATM cell as shown at the bottom of the figure. As seen in the figure, class d therefore must wait until the first three classes are empty before being allowed to send traffic.

Figure 4:
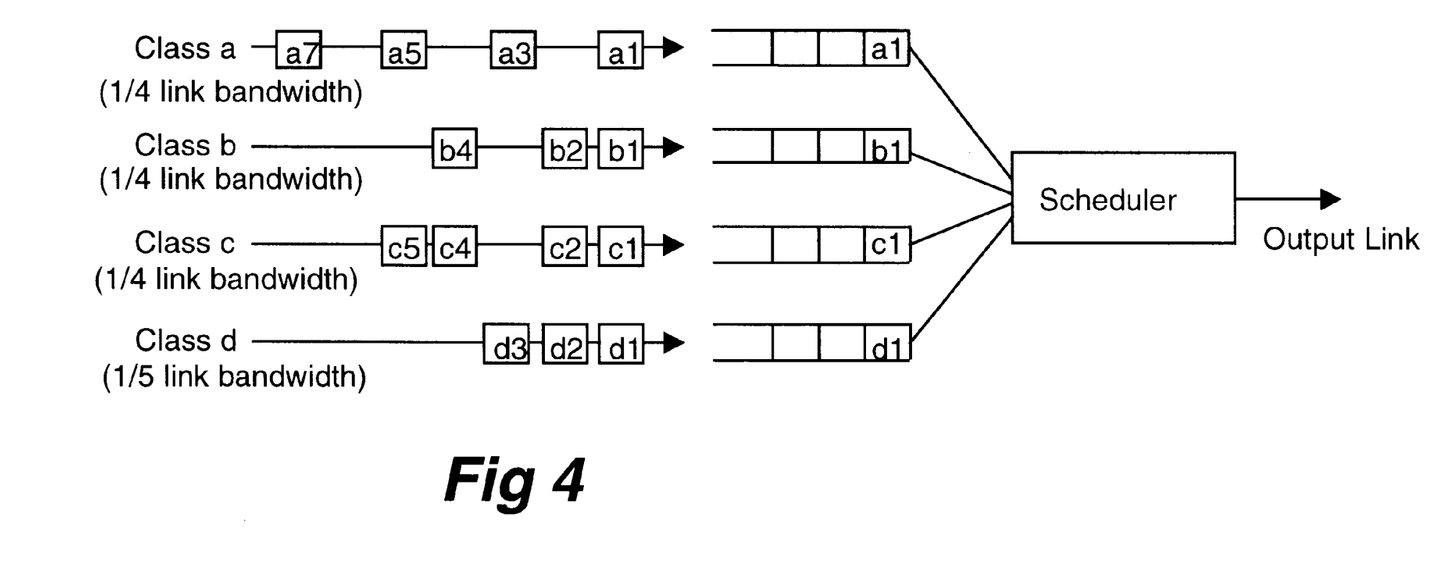
FIG. 4 is a conceptual illustration of scheduling mechanism based on rate allocation, showing also cell arrivals in queues.
Figure 5:
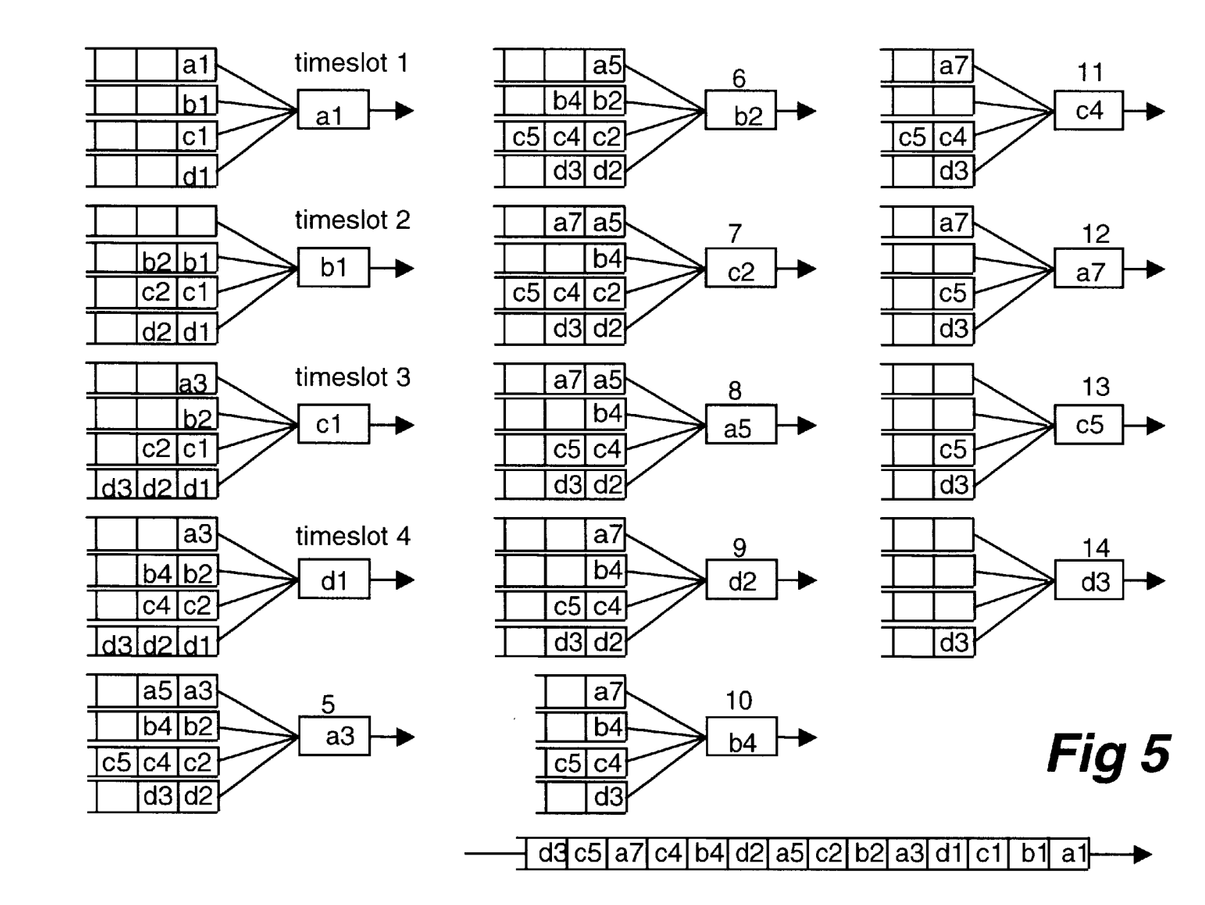
FIG. 5 shows status of queues and selection of a cell for outputting in time sequence according to the rate based scheduling mechanism. It also includes an output profile showing a series of outputted cells.

A rate scheduler selects queues according to criteria based on the preset bandwidth allocation to each class, i.e. the link bandwidth is divided among different classes of traffic based on the respective rate of traffic for each class. For example in FIG. 4, classes a to c are given ¼ (in other words, one in every four cells at the most) of the total capacity of the link and class d has ⅕ of the capacity. This gives each class a number of dedicated opportunities to send cells and limits the impact of higher priority classes. In other words, with a rate scheduler, no queue has "priority" over another. Interference (competition or contention) comes from all queues now, not just from higher priority ones. However the interference is lessened by the rate limits of the queues, and changing the assigned rates offers a way to manage the interference, thus improving isolation. Similar to FIG. 3, FIG. 5 shows a series of chart showing conditions of queues and selection of a cell for outputting at each successive output timeslot. In this example, cell arrival is the same as that shown in FIG. 2. At timeslots 1 and 2, cells a1 and b1 are selected. At timeslot 3, however, although the highest priority queue contains cell a3, the scheduler cannot send the cell out because class a has used up its allocated bandwidth when it sent out cell a1 two timeslots earlier. In other words, queue a must wait for at least three timeslots before it is allowed to send a cell. The output traffic profile on the link is therefore as shown at the bottom of the figure. Improved isolation of classes allows a better chance at meeting delay and loss guarantees for each class. This leads to simpler call admission control algorithms and higher link utilization. A programmable rate mechanism allows the scheduler to track the changing traffic profile of the link. This could be controlled by software and updated every time a connection is created/destroyed. While the rate based scheduling mechanism operates in principle as described above, there are different schemes for implementing the general concept. The invention is concerned with efficient allocation of a specified bandwidth to each traffic class.

OBJECTS OF INVENTION

It is therefore an object of the invention to provide a method of and apparatus for scheduling packet traffic onto an output link.

It is another object of the invention to provide a method of and apparatus for scheduling packet traffic in which the scheduling is based upon the bandwidth allocation among various classes of traffic.

It is still an object of the invention to provide a method of and apparatus for scheduling packet traffic in which the scheduling is based on indexing a scheduling table which indicates the next class of traffic to be serviced and updating the table according to the bandwidth allocation of the class.

It is yet another object of the invention to provide a method of and apparatus for scheduling packet traffic in which the classes in the same timeslot are linked in the table.

It is a further object of the invention to provide a method of and apparatus for scheduling ATM traffic onto an output link.

SUMMARY OF INVENTION

Briefly stated, the invention resides in a packet network in which a node receives a plurality of traffic classes and outputs them to an output link. According to one aspect, the invention is directed to a method of scheduling the traffic classes. The method comprises steps of buffering cells of each traffic class in a respective queue, assigning reference numbers, Tnext, to traffic classes buffered in the queues and creating one or more linked lists of traffic classes, each of which has traffic classes with a similar scheduled departure time determined from Tnext. The method includes further steps of outputting cells to the output link from the queues according to the scheduled departure time of the linked list of traffic classes and updating the Tnext according to the bandwidth allocated to each class.

According to another aspect, the invention is directed to an apparatus for scheduling the traffic classes in a packet network in which a node receives a plurality of traffic classes and outputs them to an output link. The apparatus comprises a plurality of queues, each queue for buffering cells of each traffic class and a class data structure containing reference numbers, Tnext, assigned to traffic classes and one or more linked lists of traffic classes, each list having traffic classes with a similar scheduled departure time determined from Tnext. The apparatus further includes a reference counter for indexing the linked lists of traffic classes according to their scheduled departure times and selecting one linked list for outputting cells to the output link according to its scheduled departure time, and a link/parser for updating the Tnext according to the bandwidth allocated to each class and for linking classes into the linked lists of the appropriate timeslots.

DETAILED DESCRIPTION OF PREFERRED EMBODIMENTS OF INVENTION

Figure 6:
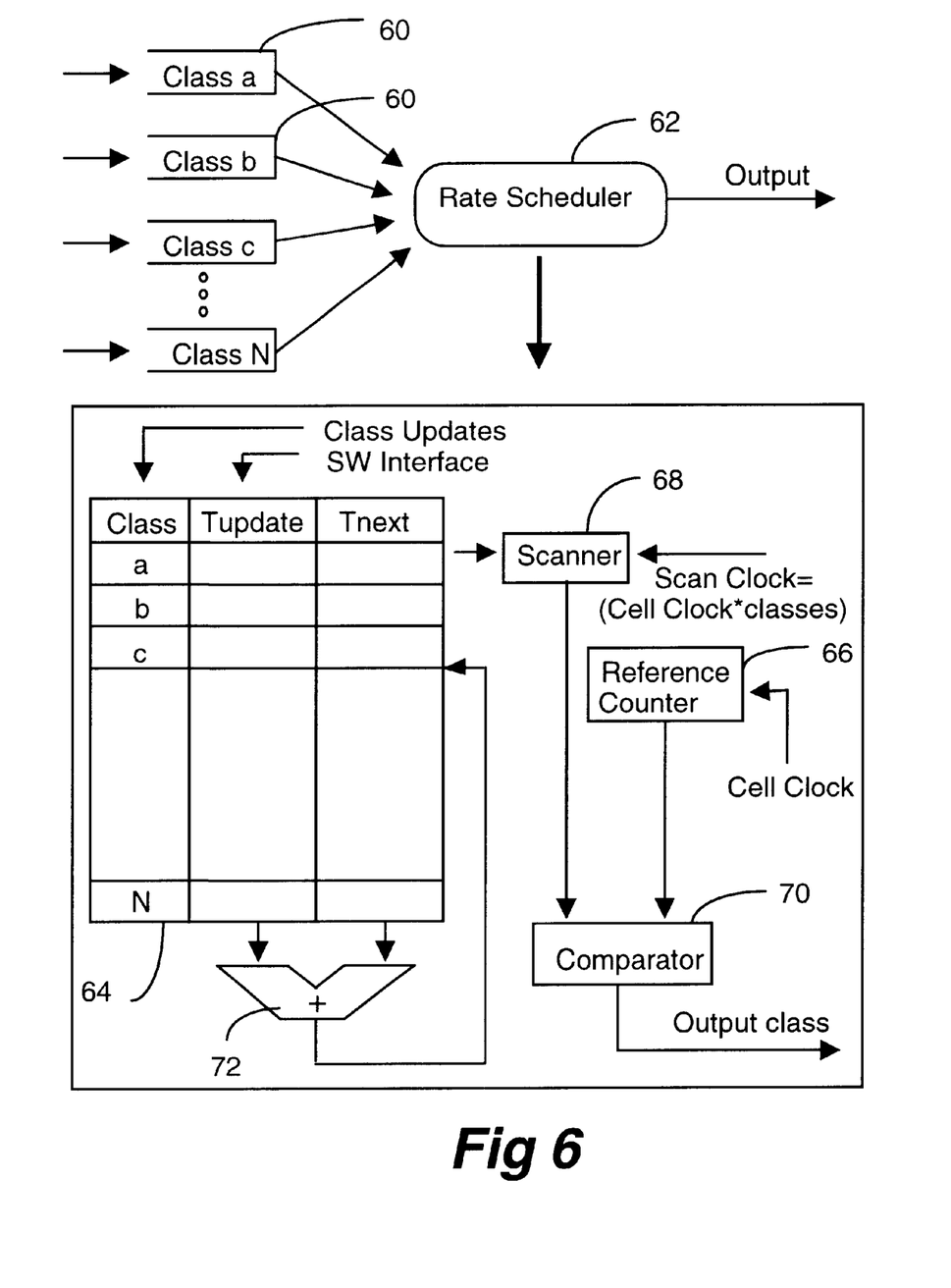
FIG. 6 is a functional block diagram of a known rate based scheduling mechanism according to the time scan scheme.

By referring to FIG. 6, the operation of a known rate based scheduler is described. In this scheduler, all the traffic classes are scanned in every cell interval (timeslot). It should be noted that it is assumed the cell interval corresponds to a timeslot in the following description. As will be described later in connection with further embodiments, they can be different from one another. This scheme therefore can be conveniently called the time scan approach. Cells which have arrived are buffered in respective queues 60 according to their traffic class. The rate scheduler 62 of this scheme includes a scheduling table 64 which hold fields called Tnext and Tupdate for each traffic class. A cell reference counter 66 increments once per cell interval (timeslot) during which interval a scanner 68 scans through Tnext field of the scheduling table to decides which class is to be serviced. Tnext is the next timeslot a cell is to go out. The scanner and the reference counter are compared at a comparator 70 and when one of the classes has a Tnext less than or equal to the reference counter, that class is selected and a cell is sent out to the link. The Tnext is updated at a gate 72 by adding the Tnext and a Tupdate value found in the Tupdate field for that class. The Tupdate value indicates the time interval (the number of timeslots) between consecutive cells of the same class. In other words this value corresponds to the rate allocated to that class. When the class usage changes (e.g. a switched virtual circuit is added/deleted to the class), the Tupdate is modified to reflect the change.

Figure 7:
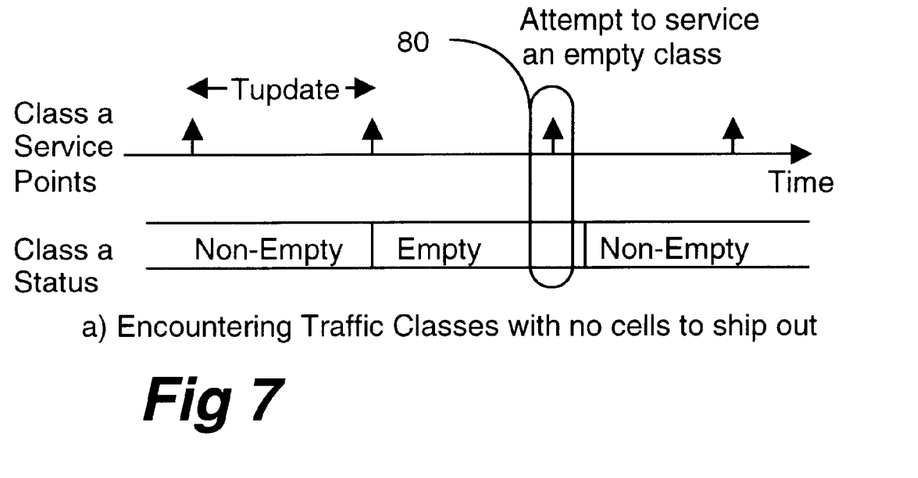
FIG. 7 shows a boundary condition in which a traffic class has no cell to send at a timeslot for its servicing.
Figure 8:
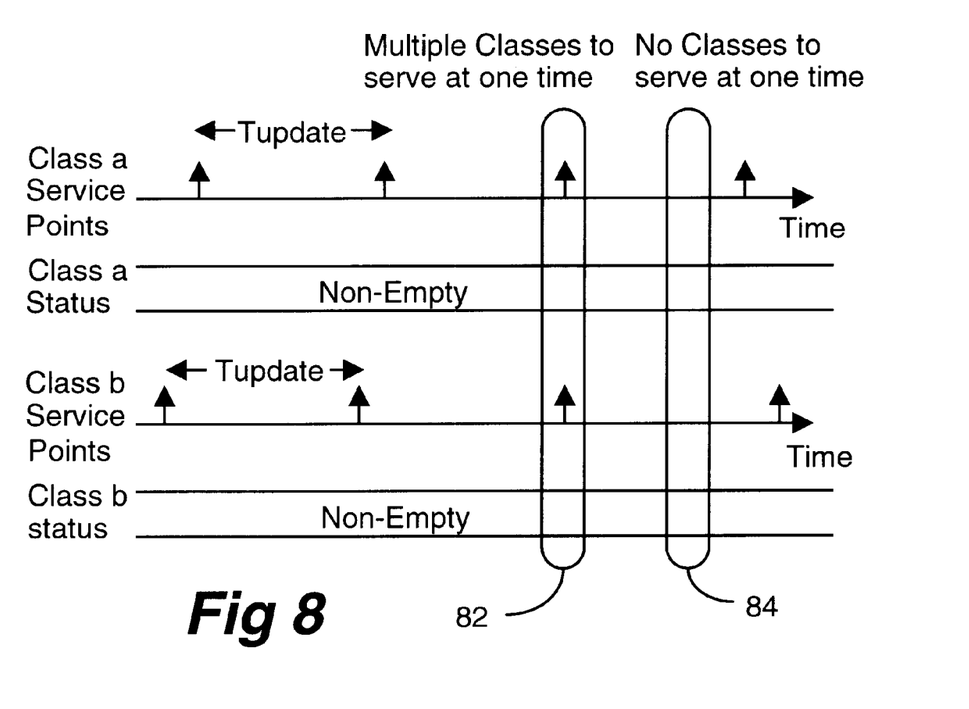
FIG. 8 depicts two other boundary conditions, one in which multiple traffic classes have cells to ship out at the same timeslot, and another in which no traffic classes are scheduled to be serviced.

This scheduler in practice encounters certain boundary conditions which must be dealt with. These conditions include empty classes, multiple classes wanting to be serviced at the same timeslot, no classes wanting to exit the switch and fixed point resolution of the update parameters. FIG. 7 illustrates the empty condition in which the scheduler finds Tnext<Reference for class a and attempts to service the class. The queue for class a, however, contains no cells to send at a timeslot 80. An empty class is bypassed by the scanner. In FIG. 8, two other boundary conditions are shown in which in one condition, multiple traffic classes, a and b, have cells to ship out in their respective queues at a timeslot 82 and in another, the scheduler finds no Tnext<Reference for any classes at a timeslot 84.

In the earlier condition, multiple classes with the same Tnext are serviced in some fashion, such as round-robin, priority, or number of cells per class. When this is done, some classes will not leave at the scheduled interval and will incur some jitter.

If shaping is being performed for the purpose of making the output rate conform to a particular rate, the Tnext should be updated by (Tupdate+Reference) instead of (Tupdate+Tnext). Thus, if the class was delayed and received service after it should have, its next service will be Tupdate from the previous service time rather than from when it should have received service. This eliminates the possibility of the jitter causing the traffic output rate to momentarily exceed the desired rate.

Periods where no classes are requesting service, (Tnext>Reference), a secondary scheduler is used to determine which class is to be serviced. This secondary element can be based on relative class size, strictly priority, round robin, or other alternate means of arbitrating between classes. Some classes may not want to be included in the arbitration (services that need to be shaped). This requires the data structure to include a flag indicating this feature.

Both Tnext and Tupdate are derived from the inverse of the allocated bandwidth. For example a Tupdate of 3 means every third cell is allocated to the class. An integer based value of Tupdate could support rates of (1, ½, ⅓, ¼ . . . ) but could not represent rates falling in between these values (e.g. ⅜). Additional bits are added to the Tnext and Tupdate parameters to provide sufficient resolution. The additional bits are used to represent "fractional" portions of these parameters. The reference counter is compared against the integer portion of the Tnext value while the Tupdate is added to the complete Tnext value. Over time the fractional component accumulates and affects the integer portion, thus providing the increased resolution needed. The number of additional bits needed is a function of the desired resolution. To provide 1.5 Mbs (approximately the bandwidth of a T1 line) resolution on a 622 Mbs link requires 9 bits.

Figure 9:
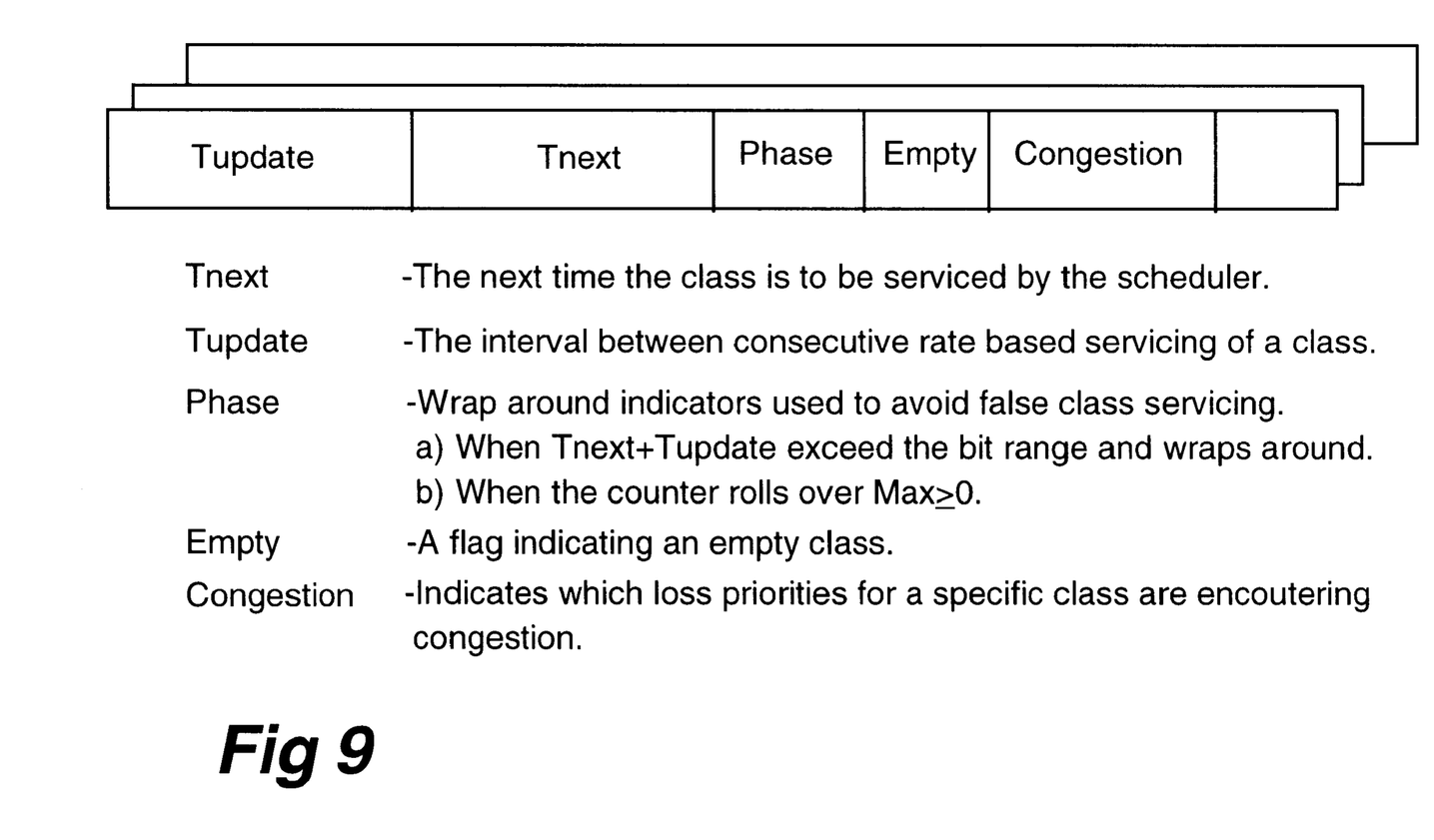
FIG. 9 is the class data structure used in the time scan scheme.

FIG. 9 is the class data structure used in the schedule table of the time scan scheme.

The time scan scheduling described thus far is limited by the need to scan the entire set of classes every cell interval. As the number of classes grows this will become increasingly more difficult to do. An article entitled "Calendar Queues: A Fast O(1) Priority Queue Implementation for the Simulation Event Set Problem" by Randy Brown in Communications of the ACM, Vol. 31, No.10, October 1988, pp. 1220–1227 proposes a basic concept of the calendar queue. The article states:

"One schedules an event on a desk calendar by simply writing it on the appropriate page, one page for each day. There may be several events scheduled on a particular day, or there may be none. The time at which an event is scheduled is its priority. The enqueue operation corresponds to scheduling an event. The earliest event on the calendar is dequeued by scanning the page for today's date and removing the earliest event written on that page."

In the computer implementation, each page of the calendar is represented by a sorted linked list of the events scheduled for that day. An array containing one pointer for each day of the year is used to find the linked list for a particular day. If the array name is "bucket", then bucket [12] is a pointer to the list of events scheduled for the 12th day of the year. The complete calendar thus consists of an array of 365 pointers and a collection of up to 365 linked list.

This concept appears to be simple to comprehend but actual implementations must address a variety of problems which must be solved. The present invention proposes a good solution to some of those problems which are related to the queue scheduling particularly associated with the communications networks.

Figure 10:
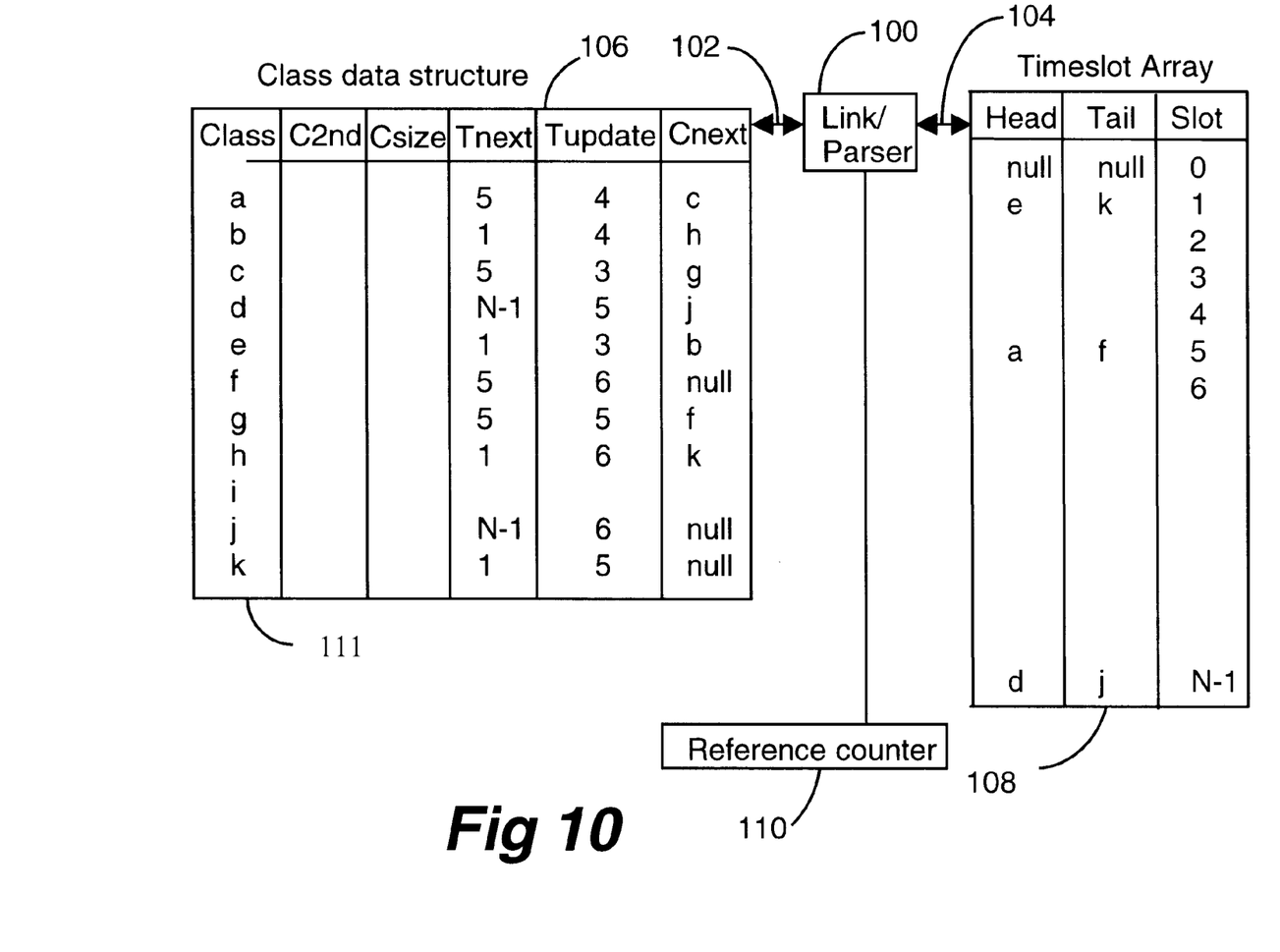
FIG. 10 is a functional block diagram of a rate based scheduling mechanism according to one embodiment of the invention.

FIG. 10 is a function block diagram of a rate based scheduling mechanism according to one embodiment of the invention. The embodiment shown in FIG. 10 overcomes the limitation of having to scan all classes every cell time. This embodiment applies the time update concept to a large number of classes such as per VC (virtual connection) queuing and overcomes the stated difficulty by constructing a linked list of traffic classes that wish to exit the switch at a given time.

In FIG. 10, link/parser block 100 has read/write access 102 and 104 to class data structure 106 and timeslot array 108. The class data structure contains the relevant fields of information for each class (note that the class identifier column 111 is not normally stored in the structure and is only shown for clarity). The timeslot array contains head and tail pointers for each timeslot. The head and tail pointers are class identifiers. The reference counter 110 indicates which timeslot is the current timeslot (also known as the current time), and indicates this to the link parser. The link parser may also use the reference counter to assist in updating or computing Tnext. A timeslot is assumed to be one cell time.

Figure 11:
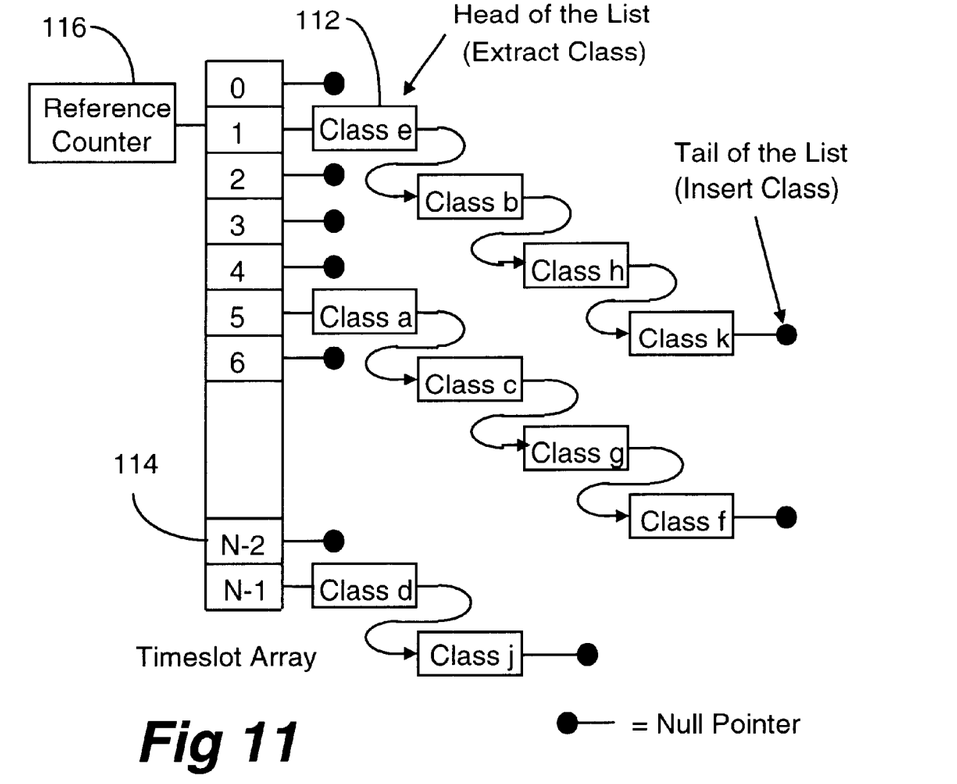
FIG. 11 shows the linked list structure of traffic classes used in the embodiment of FIG. 10.

FIG. 11 shows graphically the linked data structure of traffic classes which are being processed according to the functional block diagram shown in FIG. 10. Referring to FIGS. 10 and 11, there are three linked lists existing from the previous timeslot. The reference counter for present output is at timeslot 1. The list at timeslot 1 consists of classes e, b, h, and k. Class e is removed from the head of the list and served. The remaining classes b, h, and k, are due for service but won't receive it during this timeslot, so they are unlinked from the current timeslot and linked at the head of the next timeslot list. The result is that classes e, b, h, and k are served during timeslots 1, 2, 3, and 4, respectively. The next list starts at timeslot 5 which includes classes a, c, g and f.

When a cell arrives the class is examined and the class is appended to the end of the appropriate timeslot if the class is not already on the list. In other words, linked lists of classes 112 are created among those classes which have a Tnext of the same timeslot. Those classes in a linked list belong to the same timeslot and are linked in the timeslot array 114. The reference counter 116 increments at each timeslot and when it reaches a timeslot, the first class linked in that timeslot is issued, and the others are prefixed to the list of the next timeslot. The timeslot array keeps tracks of the head and tail of each timeslot's linked list.

As each class is pulled off the list, the next timeslot for that class is computed and the class is linked at the tail of the list associated with the next timeslot. This process accepts a parameter called cell delay variation tolerance (CDVT) which is intended to allow a controlled amount of jitter in the class's cell stream. The benefit of allowing some jitter is that it allows a class that has "fallen behind" in service due to contention with other classes a chance to "catch up" and achieve its desired rate. The benefit of preventing too much jitter is that the class's cell stream can be guaranteed to conform to an ATM connection traffic descriptor that includes sufficient CDVT.

In this embodiment, therefore, the scheduler updates Tnext by first advancing it to the current time if Tnext is in the past. The scheduler then increments Tnext by Tupdate, and attempts to schedule the class for timeslot Tnext-CDVT. In other words, the class is allowed to be served as much as CDVT earlier than it's theoretical service time.

Like the time scan scheme described above, a number of boundary conditions exist. Mechanisms for solving the update resolution and counter sizes have already been described in connection with the time scan scheme. There are others which are unique to this embodiment will be described below by referring back to FIG. 10.

In this embodiment, it is necessary to determine when a class is empty and which timeslot to allocate for a class that was previously empty. A size counter Csize is used to track the number of cells in a given class. After the last cell goes out, the counter will indicate an empty class (size=0). In this situation, the class is not submitted to the next timeslot because there are no cells to send. Instead, the next timeslot value is stored in the Tnext field and is used when the class becomes non-empty.

Having not re-linked the empty class into a timeslot introduces a new exception condition, called stale Tnext detection, that must be dealt with. This is the case of when another cell does not arrive to the class for a long time. The danger is that the computed Tnext may be misinterpreted as a future time due to the finite precision and cyclical nature of the reference counter, and thus the cell is unnecessarily delayed. To prevent this, one implementation has a background process that scans the class data structure on a regular ongoing basis, detects Tnext values that are on the verge of such misinterpretation, and re-assigns the Tnext to a safer, more recent, value no later than the current time.

Reactivating an empty class requires the scheduler to determine the timeslot placement of the class. This is done by examining the Tnext field. If the reference counter exceeds Tnext–CDVT, the cell should exit in the current timeslot in order to minimize delay and jitter.

Options

In the best mode of the invention thus described, several assumptions have been made about certain options. Some of the other options may in fact be better suited to a particular implementation depending on what its exact constraints are. This section describes several such options.

(1) Different Timeslot Assignments

Thus far, the timeslot has been assumed to correspond to a single cell time. In a different embodiment of the invention, the timeslot could instead correspond to something longer. In this embodiment, an extra error may result by not sorting departure times according to the fractional portion of Tnext, and the fractional portion now corresponding to a larger number of cell times. The additional error in departure time must be acceptable. In this embodiment, the size of the timeslot array can be reduced. The processing of a timeslot list would serve up to as many classes as there were cell times in a timeslot.

The timeslot could also correspond to a smaller time interval, a fraction of a cell time, in order to improve the accuracy of cell departure times. Sorting of entries within a timeslot list could also be done, which would strictly minimize the departure time error. However, in most practical cell scheduling applications, this level of accuracy is usually not required.

The size of the timeslot array is also determined by the maximum value of Tupdate that must be supported, which is in turn determined by the lowest rate of scheduling to be supported by the scheduler. This is because it has been assumed for simplicity that the scheduler only deals in events that occur within a bounded amount of time into the future. This avoids the complexity of having to deal with events that relate to a future instance of the timeslot rather than the current one, and also keeps the amount of work to find a class to schedule bounded and of a fixed order (often denoted O(1)).

(2) Extended Tupdate

In a different embodiment, the scheduler could have been implemented with extra complexity to deal with events further in the future than the timeslot array's reach. Using the calendar analogy, this would be done by scheduling events on a particular day, regardless of the year in which they were to happen; in other words, the mapping of Tnext to timeslot is still cyclical, but includes multiple cycles. This comes at the expense of being able to deterministically pick the next class to serve from a timeslot list. Instead, the scheduler may have to process several future events before finding one (or none) for the current timeslot. Given any finite processing speed, the scheduler may therefore be unable to find the next class in time for it to be scheduled during the current timeslot, thus forcing some other (default) class to be served, or worse, an idle cell to be sent. This is a form of performance degradation. Nonetheless, this may be reasonable if the range of Tupdate to be supported dictated a prohibitively large timeslot array, and use of a longer timeslot would not meet accuracy requirements. The scheduler would need sufficient speed to process many class entries in a single timeslot, and would have to compare each class's Tnext to the reference counter to know if the class was eligible for service this timeslot.

(3) Due List

If an implementation places a premium on timeslot array accesses (e.g. they must use a shared bus to an external memory), then the operation of prefixing the current timeslot's unserved classes at the head of the next timeslot may be eliminated by creating another list called "due list" or overdue list (e.g. managed by on-chip head and tail pointers). In such an embodiment of the invention, the due list contains all classes that are currently due for service. At the beginning of each timeslot, the timeslot's list of classes is suffixed to the due list. The first class on the due list is then removed and served. This approach may be easily rearranged in a different embodiment of the invention so that the "due list" is instead an "overdue list" by taking the class to be served directly from the timeslot list's head in situations where the overdue list is empty, and suffixing only the unserved classes to the overdue list instead of suffixing the entire timeslot list.

(4) Tail-only list

In order to economize on timeslot array size at the expense of class data structure accesses, a further embodiment of the invention may store only tail pointers in the timeslot array instead of both head and tail pointers. This requires each timeslot's list to be circularly linked, i.e. the tail entry points back to the head entry. The head entry can therefore be determined by following the link from the tail entry.

(5) Skewed operation

Figure 12:
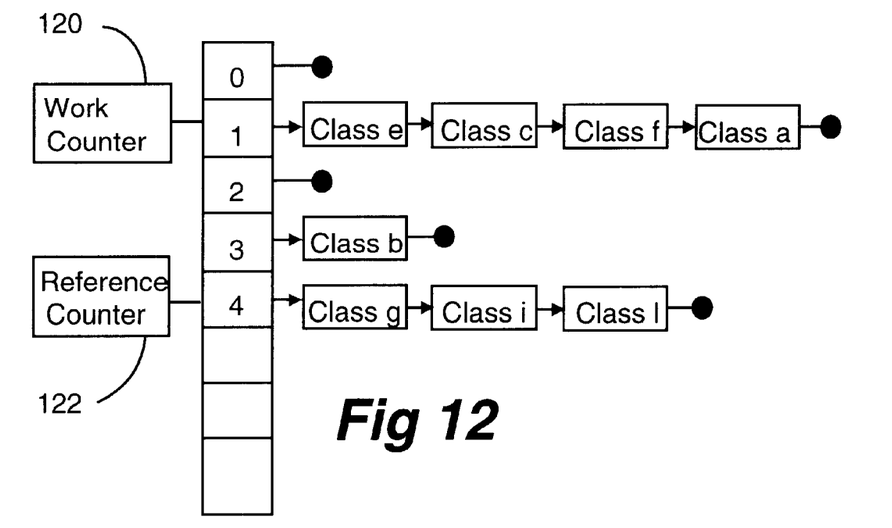
FIG. 12 is a schematic illustration a timeslot array and two counters used for describing a skew mode of operation.

The preferred embodiment of the invention can be described as operating deterministically, i.e. it can find the correct next class to serve in a fixed, bounded amount of time independent of the number of classes. A few of the keys to achieving this are to ensure that only non-empty classes are linked into timeslot lists, and that unserved classes from a timeslot are appropriately handled, either by linking them to the next timeslot, or to a due list. Circumstances may force an implementation to compromise one or more of these points. For example, when empty classes receive a cell they require extra processing to determine when they are eligible for service; this may not fit within the design budget. Or it may be desired to avoid the extra timeslot memory required for both head and tail pointers, and instead provide only head pointers. If such a compromise is made, the invention can be modified at the expense of losing its deterministic behaviour. The resulting non-deterministic behaviour requires a second counter, called the work counter, to supplement the reference counter This is shown in FIG. 12. The work counter 120 points to the timeslot currently being processed and the reference counter 122 points to the current timeslot with respect to time. The scheduler needs extra processing speed to try and keep the work counter caught up to the reference counter, but it will occasionally fall behind, resulting in a condition referred to as "skewed". Skew can be reduced by designing the scheduler to process classes faster.

Therefore, in this further embodiment of the invention, a work counter is maintained to keep track of the timeslot currently being processed, which may be different than the current timeslot. The scheduler advances the work counter if it has processed all classes in that timeslot and the reference counter is at a different timeslot. The scheduler is expected to be able to process empty classes (if present) and empty timeslots, i.e. those having no class list, at an accelerated rate in order to facilitate returning the work counter to the reference counter's value.

Yet another embodiment of the invention would, upon serving the last cell from a class, re-schedule the class into a new timeslot in the same manner used for non-empty classes. New timeslot list processing may encounter an empty class, in which case it will remove the class from the list, and set a special flag for the class to indicate that it is eligible for immediate service. When a cell arrives to such a flagged class, the enqueue processing is simplified by not having to compute when the class is eligible for service.

(6) Inverse UPC Shaping

In ATM, cell flows can be policed, meaning they are checked for conformance to a given rate, with a given tolerance for jitter above that rate. The algorithm to do this is called GCRA (Generic Cell Rate Algorithm). The preferred embodiment described above uses a CDVT parameter to control the amount of jitter in the outgoing cell stream. This is done in such a way as to be compatible with a GCRA policer, that is to say, all cells emitted by the scheduler will be found conforming by a policer using the same rate and CDVT parameters as the scheduler. The approach can be extended to include compatibility with multiple GCRA policers, thus offering assured conformance of the outgoing cell stream with a wider variety of policing configurations. For example, a class could be shaped to be conforming to both a peak cell rate and a sustained cell rate, which is required for the VBR (Variable Bit Rate) service category of ATM. In such an implementation, Tupdate, Tnext, and CDVT parameters are used for each anticipated GCRA policer. Each Tnext is updated in the same manner, but using its associated Tupdate. The class is rescheduled at the earliest time that satisfies all GCRA policers, which is the latest value of Tnext−CDVT computed for all policers.

(7) Non-CDVT, no catch-up and unbounded catch-up

In some implementations, it may be unnecessary or undesirable to implement the CDVT aspect of the invention, possibly for reasons of reducing complexity or parameter storage. There are two fundamental ways of achieving this, and they differ in their treatment of a class that gets served after its ideal service time. One approach rigidly respects the maximum rate the class is to be served at, at the expense of the class being able to achieve that rate if it ever falls behind. A different embodiment of the invention that does this would always update Tnext to be the Ref. Ctr+Tupdate, and would re-schedule a non-empty class at the corresponding timeslot.

The other approach allows the class to exceed its rate in order to catch up at the expense of having a firm bound on the amount or duration of the excess, which is essentially dictated by overall operating conditions of the scheduler, specifically the amount of internal contention for timeslots. Since it is desired to restrict the occurrence of excess rate to such cases, it is important to differentiate them from the case of a class that has been idle for a long time, thus having an old Tnext and appearing to be behind in service. In yet another embodiment of the invention that would achieve this, the scheduler updates Tnext by adding Tupdate. For a non-empty class, if the result is behind the current time, the class is rescheduled at the current timeslot, otherwise it is rescheduled at the Tnext timeslot. A cell arriving to an empty class with Tnext behind current time is scheduled at the current timeslot and its Tnext is set to current time.

(8) Fractional Tnext

Again in the interest of reducing class context memory, another embodiment of the invention stores only the fractional bits of the Tnext parameter in context memory, and inferring the integer bits from the timeslot. If applied to the preferred embodiment already described, then the integer bits of Tnext are simply assumed to be the same as the current timeslot number (i.e. the time of service). The drawback to this is that the inference is incorrect when the class received service after its desired service time due to contention, and hence the error causes the class to receive less than its desired bandwidth. This can, however, be resolved by applying the fractional Tnext concept to an embodiment using the skewed mode of operation, in which case the integer bits of Tnext are inferred from the work pointer, which does accurately reflect the desired timeslot of service for the class because it is not advanced until all classes in that timeslot have been served. Of course, the other drawbacks of skewed operation (already described) will apply. Also note that both of these forms of inference are incompatible with the approach used in the preferred embodiment to deal with CDVT, since the class is scheduled at time earlier than its Tnext (due to the CDVT).

We claim:

1. In a packet network in which a node receives a plurality of traffic classes and outputs them to an output link, a method of scheduling the traffic classes, comprising steps of:

buffering cells of each traffic class in a respective queue;

assigning reference numbers, Tnext, to traffic classes buffered in the queues;

creating one or more linked lists of traffic classes, each list having traffic classes with a similar scheduled departure time determined from Tnext;

outputting cells to the output link from the queues according to the departure time of the linked list of traffic classes, and updating the Tnext according to the bandwidth allocated to each class.

2. The method of scheduling the traffic classes according to claim 1 wherein the step of updating the Tnext includes a further step of adjusting Tnext by Tupdate, where Tupdate is inversely proportional to the bandwidth allocated to each class.

3. The method of scheduling the traffic classes according to claim 2 wherein a class data structure includes fields for Tnext, Tupdate, a size counter the last of which tracks the number of cells stored in a queue for each class and the method comprises the step of creating one or more linked lists of traffic classes from classes which are so determined by the size counter to have cells in their queues.

4. The method of scheduling the traffic classes according to claim 2 comprising a further step of maintaining pointers to indicate the head and tail of each linked list.

5. The method of scheduling the traffic classes according to claim 2 comprising further steps of making each linked list circular and maintaining a pointer to indicate the tail of each linked list.

6. The method of scheduling the traffic classes according to claim 2 comprising a further step of moving all of classes in a linked list which are not serviced at a timeslot to the next timeslot in the same order of the linked list.

7. The method of scheduling the traffic classes according to claim 2, wherein the linked list of each timeslot contains classes also scheduled for departure in future instance of the timeslot and the method comprises a further step of determining which class to serve currently from the linked list by examining Tnext of classes in the linked list.

8. The method of scheduling the traffic classes according to claim 2 comprising a further step of indexing a timeslot array by a reference counter for a linked list of traffic classes to be serviced for outputting a cell of said traffic class at a next timeslot.

9. The method of scheduling the traffic classes according to claim 2 comprising a further step of scanning a timeslot array for a linked list of traffic classes to be serviced by maintaining a reference counter indicating a current timeslot with respect to time and a work counter indicating the timeslot currently being processed.

10. The method of scheduling the traffic classes according to claim 2 comprising a further step of computing the scheduled departure time by using Tnext and CDVT, where CDVT is a cell delay variation tolerance parameter.

11. The method of scheduling the traffic classes according to claim 10 comprising further steps of deriving the Tupdate and CDVT to conform to one or more GCRA policers, computing the departure times from Tnext and CDVT for each of the GCRA policers and choosing the latest departure time for cell outputting.

12. The method of scheduling the traffic classes according to claim 2, comprising a further step of: if there is a contention between classes for service at a timeslot, moving classes in a linked list to an overdue list.

13. The method of scheduling the traffic classes according to claim 12, comprising further a step of serving the classes in the overduelist ahead of other classes in a timeslot array.

14. An apparatus for scheduling a defined group of traffic classes in a packet network in which a node receives the traffic classes and outputs them to an output link, comprising:
- a plurality of queues, each queue for buffering cells of each of the traffic classes;
- a class data structure containing reference numbers, Tnext, assigned to the traffic classes buffered in the queues and one or more linked lists of the traffic classes, each list having the traffic classes with a similar scheduled departure time determined from Tnext; and
- a reference counter for indexing the linked lists of the traffic classes according to their scheduled departure times and selecting one linked list of the traffic classes for outputting cells to the output link according to its scheduled departure time and a link/parser for updating the Tnext according to the bandwidth allocated to each of the traffic classes and for linking the traffic classes into the linked lists of the appropriate timeslots.

15. The apparatus for scheduling the traffic classes according to claim 14, wherein the class data structure comprises further a field for Tupdate, which is inversely proportional to a bandwidth allocated to each class and the arithmetic device uses Tupdate for updating the Tnext.

16. The apparatus for scheduling the traffic classes according to claim 15 wherein the class data structure comprises further a size counter which tracks the number of cells stored in a queue for each class and one or more linked lists of traffic classes contain classes which are so determined by the size counter to have cells in their queues.

17. The apparatus for scheduling the traffic classes according to claim 15, further comprising timeslot pointers indicating the head and tail of each linked list of traffic classes.

18. The apparatus for scheduling the traffic classes according to claim 15, wherein each linked list is circular and the apparatus further comprising a timeslot pointer indicating the tail of each linked list of traffic classes.

19. The apparatus for scheduling the traffic classes according to claim 15, wherein a timeslot and a cell time are different from one another in length.

20. The apparatus for scheduling the traffic classes according to claim 15, wherein the linked list of each timeslot contains classes also scheduled for departure in future instance of the timeslot and the reference counter further comprises means for determining which class to serve currently from the linked list by examining Tnext of classes in the linked list.

21. The apparatus for scheduling the traffic classes according to claim 15, further comprising a timeslot array and a pointer for keeping tracks of a current timeslot at which the cells of traffic classes are output.

22. The apparatus for scheduling the traffic classes according to claim 15, further comprising a scanner for scanning a timeslot array by using the reference counter for keeping tracks of a current timeslot with respect to time and by a work counter for keeping track of a timeslot which is currently being processed.

23. The apparatus for scheduling the traffic classes according to claim 15, wherein the class data structure comprises further a field for CDVT, where the CDVT is a cell delay variation tolerance parameter and the arithmetic device uses further the CDVT for modifying the scheduled departure time.

24. The apparatus for scheduling the traffic classes according to claim 23, wherein the scheduled departure time is derived from Tnext and CDVT to conform to one or more GCRA policers.

25. The apparatus for scheduling the traffic classes according to claim 15, further comprising an overdue list for storing an overdue list of traffic classes, the overdue list of traffic classes containing traffic classes which were not serviced at a specified timeslot assigned to said traffic classes but are to be serviced in priority over newly eligible classes.

* * * * *